United States Patent
Henry et al.

(10) Patent No.: US 11,962,567 B2
(45) Date of Patent: Apr. 16, 2024

(54) ADDRESS ROTATION AWARE DYNAMIC HOST CONTROL PROTOCOL

(71) Applicant: Cisco Technology, Inc., San Jose, CA (US)

(72) Inventors: Jerome Henry, Pittsboro, NC (US); Robert E. Barton, Richmond (CA); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 8 days.

(21) Appl. No.: 17/536,628

(22) Filed: Nov. 29, 2021

(65) Prior Publication Data

US 2022/0385623 A1    Dec. 1, 2022

Related U.S. Application Data

(60) Provisional application No. 63/193,899, filed on May 27, 2021.

(51) Int. Cl.
*H04L 61/5014* (2022.01)
*H04L 101/622* (2022.01)

(52) U.S. Cl.
CPC .... *H04L 61/5014* (2022.05); *H04L 2101/622* (2022.05)

(58) Field of Classification Search
CPC ........... H04L 61/5014; H04L 2101/622; H04L 61/5007; H04L 61/4511
See application file for complete search history.

(56) References Cited

U.S. PATENT DOCUMENTS 8,724,583 B2    5/2014  Gundavelli et al.
9,853,938 B2 *  12/2017 Shih ........................ H04L 41/12
(Continued)

FOREIGN PATENT DOCUMENTS

JP         2013214825 A  * 10/2013

OTHER PUBLICATIONS

IEEE, "IEEE Standard for Local and metropolitan area networks—Port-Based Network Access Control," IEEE Std 802.1X™—2010 (Revision of IEEE Std 802.1X-2004), Feb. 2010, 222 pages.

*Primary Examiner* — Dhairya A Patel
*Assistant Examiner* — Alex H. Tran
(74) *Attorney, Agent, or Firm* — Edell, Shapiro & Finnan, LLC

(57) ABSTRACT

A method comprises, at a wireless network controller of wireless access points through which wireless client devices that are wireless communicate with the controller: upon receiving, from a wireless client device, a dynamic host configuration protocol (DHCP) request having a media access control (MAC) address, determining whether the wireless client device rotated its MAC address from a previous MAC address to the MAC address; when the wireless client device rotated its MAC address, forwarding, to a DHCP service, the DHCP request with a notification of a MAC address rotation to cause the DHCP service to reassign a previously assigned Internet Protocol (IP) address to the wireless client device; and upon receiving, from the DHCP service, a DHCP offer asserting the previously assigned IP address, forwarding the DHCP offer to the wireless client device.

20 Claims, 6 Drawing Sheets

(56) References Cited

U.S. PATENT DOCUMENTS

| | | | |
|---|---|---|---|
| 10,075,410 B2* | 9/2018 | Lambert | H04L 61/103 |
| 10,506,497 B2* | 12/2019 | Chen | H04W 40/02 |
| 2009/0307338 A1 | 12/2009 | Arberg et al. | |
| 2012/0023207 A1* | 1/2012 | Gandhewar | H04L 61/5038 |
| | | | 709/221 |
| 2016/0248730 A1 | 8/2016 | Iyer | |
| 2017/0111443 A1* | 4/2017 | Zhou | H04L 67/1008 |
| 2017/0339099 A1* | 11/2017 | Levy-Abegnoli | H04L 67/52 |
| 2018/0310221 A1* | 10/2018 | Amini | H04W 72/569 |
| 2018/0359811 A1* | 12/2018 | Verzun | H04W 12/03 |
| 2020/0007600 A1* | 1/2020 | Tsoutsaios | H04L 67/54 |
| 2020/0351648 A1 | 11/2020 | Fang | |
| 2021/0168115 A1 | 6/2021 | de la Oliva et al. | |
| 2022/0021675 A1* | 1/2022 | Bhattacharya | H04L 63/10 |
| 2022/0038454 A1* | 2/2022 | Kuarsingh | H04L 63/20 |
| 2022/0166774 A1* | 5/2022 | Lee | H04L 63/162 |

* cited by examiner

ADDRESS ROTATION AWARE DYNAMIC HOST CONTROL PROTOCOL

CROSS REFERENCE TO RELATED APPLICATION

This application claims priority to U.S. Provisional Application No. 63/193,899, filed May 27, 2021, the entirety of which is incorporated herein by reference.

TECHNICAL FIELD

The present disclosure relates to secure networking.

BACKGROUND

Many operating systems implement device address rotation methods that are designed to improve user privacy. By changing the device address, such as a media access control (MAC) address, it can be more difficult for an eavesdropper to track a location of a device of a user, but also, in some circumstances, more difficult to monitor online activities of the user. While rotation of a device address can improve privacy, some legacy network infrastructure is not designed to accommodate such address rotation, and in many cases, uses the rotating device address as an identifier of the device for a variety of processing.

DESCRIPTION OF EXAMPLE EMBODIMENTS

Overview

Figure 1:
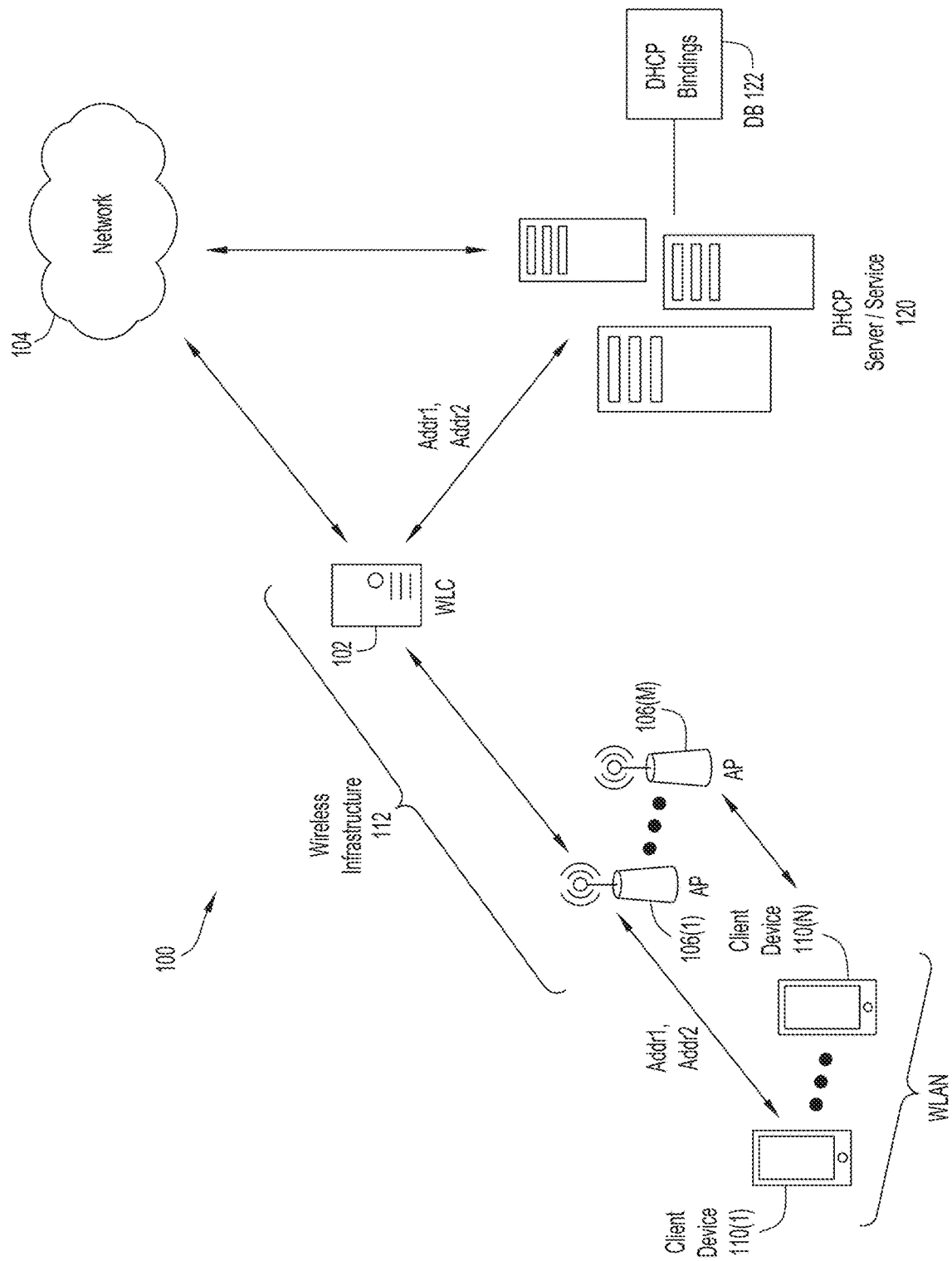
FIG. 1 is block diagram of a network environment in which embodiments that take account of MAC address rotation may be implemented, accordance to an example embodiment.

In a first embodiment, a method is performed at a controller of wireless access points through which wireless client devices communicate with the controller. The method includes: upon receiving, from a wireless client device, a dynamic host configuration protocol (DHCP) request having a media access control (MAC) address, determining whether the wireless client device rotated its MAC address from a previous MAC address to the MAC address; when the wireless client device rotated its MAC address, forwarding, to a DHCP service, the DHCP request with a notification of a MAC address rotation to cause the DHCP service to reassign a previously assigned Internet Protocol (IP) address to the wireless client device; and upon receiving, from the DHCP service, a DHCP offer asserting the previously assigned IP address, forwarding the DHCP offer to the wireless client device.

In a second embodiment, a method is performed at a DHCP service configured to assign IP addresses from a pool of IP addresses to client devices configured to communicate wirelessly through a wireless infrastructure including wireless access points and a controller. The method includes: repeatedly polling the wireless infrastructure for a number of active client devices on the wireless infrastructure and, for each polling, computing a divergence between (i) a number of active IP addresses assigned by the DHCP service to the client devices and that have a lease time that has not expired, and (ii) the number of active client devices; comparing the divergence to a trigger threshold indicating the pool of IP addresses is near exhaustion; and when the divergence reaches the trigger threshold, reducing the lease time for subsequently assigned IP addresses.

Example Embodiments

Randomized and changing MAC addresses (RCM) is generally viewed as a privacy improvement that helps to obfuscate user and device identity and prevent unconsented tracking. Depending on the mechanism used to rotate and change MAC addresses (e.g., network infrastructure initiated or wireless client device (also referred to as a "STA") initiated), a rate of MAC address rotation can be different for each wireless client device, and thus challenging to predict.

Internet Protocol (IP) address management for wireless client devices in a local area network (LAN) is generally controlled by a dynamic host control protocol (DHCP) service implemented on one or more servers, for example. DHCP uses a limited pool of IP addresses (also referred to as a "DHCP address pool") that may be assigned to wireless client devices on a segment or IP subnet of a network. When an IP address is assigned to a wireless client device by the DHCP service, it is reserved for use by that wireless client device for a given lease time. During the lease time, i.e., while the IP address is active, the wireless client device has exclusive use of the IP address and, conventionally, the IP address will not be reassigned to another wireless client device. Upon leaving a network, a wireless client device that is leasing an IP address may send a "DHCP release" message to free the address such that it can be returned to the pool of available IP addresses. However, many wireless client devices do not transmit a DHCP release message, and thus its use is rare in practice. There are many reasons for a lack of use of the DHCP release message. For example, some wireless client devices are implemented such that the previous IP address is maintained in memory, and can be reclaimed if the wireless client device re-joins the network before expiration of the lease period. Once a wireless client device leaves the network, the DHCP service will not reassign a leased IP address until the lease has expired. When a wireless client device does release the address, some DHCP service implementations keep the address reserved for the remainder of the lease period. For example, some DHCP services are designed to provide for the scenario described above, with the wireless client device rejoining the network before the lease expires, thus avoiding a release/reallocation of a new IP address. This provides some improvements to session stability in this scenario.

In some implementations, a DHCP lease time is configured in the DHCP service, and is a static value for IP addresses allocated by the DHCP service. Generally, at any time during a lease validity interval of an IP address, a wireless client device requests the lease to be renewed for an equivalent duration as previously provided by the DHCP service. Some wireless client device implementations request lease renewal if they are still using the IP address after one-half of the leased time has expired.

In relatively large wireless networks, DHCP address exhaustion is a challenge under certain circumstances. In some environments, a network administrator has a limited number of IP addresses available for a pool of addresses to be allocated to wireless client devices. To ensure there are enough addresses available for the needs of the network, the network administrator tailors a lease time of the available addresses to avoid waste of IP addresses that remain leased long after use of the addresses ceases. If IP address lease times are set to be too short, other problems are created. For example, a short IP address lease time contributes to increasing management traffic overhead, as devices network communication necessary to renew expiring leases increases as IP address lease times decrease.

There is generally no way to synchronize a schedule of MAC address rotations of a wireless client device with a DHCP IP address lease allocated to said wireless client device. This results in either DHCP resource exhaustion, or increasing network overhead via the use of relatively short DHCP lease times.

When a DHCP service is unaware of a rotation of a wireless client device's MAC address from a previous MAC address to a new MAC address, the DHCP service recognizes the new MAC address as originating from a new wireless client device. Thus, the DHCP service generally allocates a new IP address to the new wireless client device. In this case, the wireless client device has two IP addresses allocated to it, one associated with the previous MAC address and a second IP address associated with the new MAC address. In such an environment, if a DHCP lease is set to two hours, but a frequency of MAC address rotation is 15 minutes, eight addresses will be consumed by a single wireless client device. This results, in some network environments, IP address pool exhaustion (e.g., a pool with 254 addresses, and 32 wireless client devices are enough to overload the pool). If the DHCP lease time is reduced to 15 minutes, any wireless client devices that have a longer MAC address rotation interval will request a lease renewal from the DHCP service. This lease renewal traffic consumes network resources of a wireless network. An IP address lease that is too short also, in some circumstances, causes instability at the wireless client device. For example, in an example scenario, a wireless client device is participating in a multi-media communications session. After a period of time elapses, the session is interrupted by a change of IP addresses caused by an expiration of a DHCP lease. This requires, in some circumstances, the session to be restarted.

Thus, embodiments presented herein improve the DHCP service to facilitate better coordination between IP address leases provided by the DHCP service to wireless client devices in a wireless network and MAC address rotations that occur within the wireless network. The embodiments synchronize RCM activity on the wireless network with the DHCP service. With a first embodiment, a wireless infrastructure (e.g., wireless access points (APs) and/or a wireless LAN controller (WLC)) detects MAC address rotation by a wireless client device, and notifies the DHCP service of a new MAC address associated with a previous MAC address for the wireless client device, which enables the DHCP service to coordinate new wireless client device MAC address-to-IP address mappings (referred to as "DHCP bindings") maintained by the DHCP service.

In a second embodiment, the wireless infrastructure does not detect address rotations, and thus does not assist in coordination of updating DHCP bindings. Instead, the DHCP service actively adapts the DHCP leasing time (i.e., IP address least times) to reflect the MAC address rotation activity on the wireless network. More specifically, the DHCP service monitors a relationship between a number of active IP address leases on a wireless network and a number of active wireless client devices on the wireless network. When the number of active IP addresses relative to the number of active wireless client devices exceeds a predefined threshold, the DHCP service reduces a lease time of new IP address assignments. The relationship may be reevaluated periodically, with the lease time being adjusted as needed to balance availability of IP addresses and network overhead associated with shorter lease times.

With reference to FIG. 1, there is a block diagram of an example network environment 100 in which embodiments presented herein may be implemented. Network environment 100 includes a WLC 102 that is connected to and communicates with a network 104. Network 104 may include one or more wide area networks (WANs), such as the Internet, and one or more LANs. WLC 102 also communicates with and controls wireless APs 106(1)-106(M) (collectively referred to as "APs 106"), which serve a WLAN 108 that operates on an IP subnet and to which wireless client devices 110(1)-110(N) belong. WLC 102 serves as a bridge to transport traffic (e.g., data packets) between network 104 and WLAN 108. Together, WLC 102 and APs 106 represent a wireless infrastructure (also referred to as a "wireless network infrastructure") 112. APs 106 provide wireless connectivity with wireless client devices 110(1)-110(N), which access WLC 102 and network 104 through the APs. Wireless client devices 110(1)-110(N) associate to and are authenticated under control of WLC 102 in order to establish communication sessions. Once authenticated, wireless client devices 110(1)-110(N) may exchange packets with network 104 through APs 106 and WLC 102 during the communication sessions, in which case the WLC forwards the packets between the network and the wireless client devices. In the ensuing description, a wireless client device is also referred to as a "client" and a "client device").

Network environment 100 further includes a DHCP service 120 that communicates with WLC 102 over network 104, for example. DHCP service 120 may include an application or service hosted on or implemented by one or more servers connected to network 104. DHCP service 120 manages a pool of IP addresses (also referred to as the "DHCP address pool") and assigns or allocates the IP addresses to clients 110(1)-110(N) for their communication sessions. Clients 110(1)-110(N) and DHCP service 120 exchange DHCP requests and responses, including DHCP discover, offer, request, and acknowledge, for example, by which the clients request, and the DHCP service assigns, IP addresses. In the example of FIG. 1, WLC 102 relays or forwards the DHCP requests and responses between DHCP service 120 and clients 110(1)-110(N). When DHCP service 120 assigns IP addresses to requesting clients, the DHCP service records DHCP bindings in entries of a database 122 for the assigned IP addresses. Each DHCP binding represents an IP address-to-MAC address and lease time mapping for a client to which the IP address is assigned and mapped. DHCP bindings that may result when a client rotates its MAC address are now described in connection with FIGS. 2A and 2B, and also with continued reference to FIG. 1.

Figure 2A:
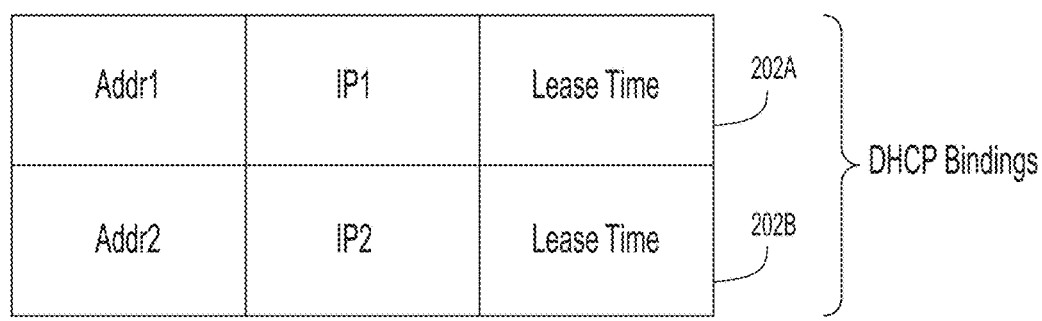
FIG. 2A is an illustration of dynamic host configuration protocol (DHCP) bindings that may be recorded by a DHCP service when MAC address rotation is not taken into account by the DHCP service, according to an example embodiment.

With reference to FIG. 2A, there is an illustration of DHCP bindings that may result when MAC address rotation is not taken into account. In the examples of FIGS. 2A and 1, client 110(1) rotates its MAC address from Addr1 to Addr2, and sends a respective DHCP request to DHCP service 120 for a new IP address for each MAC address. DHCP service 120 does not take into account the MAC rotations, and thus assigns different IP addresses IP1 and IP2 to client 110(1) corresponding to MAC addresses Addr1 and Addr2 (even though they represent the same client) in response to the DHCP requests. DHCP service 120 records duplicate DHCP bindings for the client. For example, DHCP service 120 records a first DHCP binding 202A mapping first IP address IP1 to first MAC address Addr1 and a lease time for IP address IP1, and a second DHCP binding 202B mapping second IP address IP2 to second MAC address Addr2 and a lease time for IP address IP2.

Figure 2B:
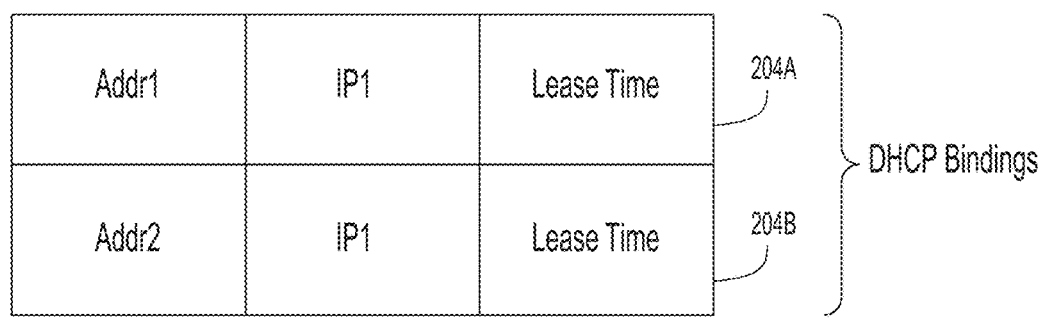
FIG. 2B is an illustration of DHCP bindings that may be recorded by the DHCP service when MAC address rotation is taken into account by the DHCP service, according to an example embodiment.

With reference to FIG. 2B, there is an illustration of DHCP bindings that result when MAC address rotation by a client is taken into account using the first embodiment. In the example of FIG. 2B, client 110(1) rotates its MAC address from Addr1 to Addr2, and sends a respective DHCP request to DHCP service 120 for a new IP addresses for each MAC address. According to the first embodiment, the wireless infrastructure detects the MAC rotation based on contents of the two DHCP requests that traverse the wireless infrastructure, and notifies DHCP service 120 of the RCM event. In response to the notification, DHCP service 120 assigns the same IP address IP1 to client 110(1) for each of MAC addresses Addr1 and Addr2 because they represent the same client. DHCP service 120 records a first DHCP binding 204A mapping IP address IP1 to first MAC address Addr1 for a lease time, and a second DHCP binding 204B mapping IP address IP1 to second MAC address Addr2 for a lease time, which may be a new lease time or an extension of the lease time of binding 204A. Thus, the awareness of MAC rotation provided by the notification from the wireless infrastructure enables DHCP service 120 to allocate its IP addresses more efficiently based on that awareness.

The first embodiment is now described in further detail. Often, rotation of a MAC address by a client results in a transient disconnection of the client from a wireless network. When the client reconnects to the wireless network, the client initiates a new DHCP request, requesting a new IP address assignment. While a DHCP service would generally assign a new IP address when observing a new MAC address as described above in connection with FIG. 2A, it is desirable that the same/previous IP address be reassigned as described above in connection with FIG. 2B. According to the first embodiment, the network infrastructure detects, and notifies the DHCP service, of the rotation. In response, the DHCP reassigns the same IP address to the rotated MAC address, instead of issuing a new IP address.

Figure 3:
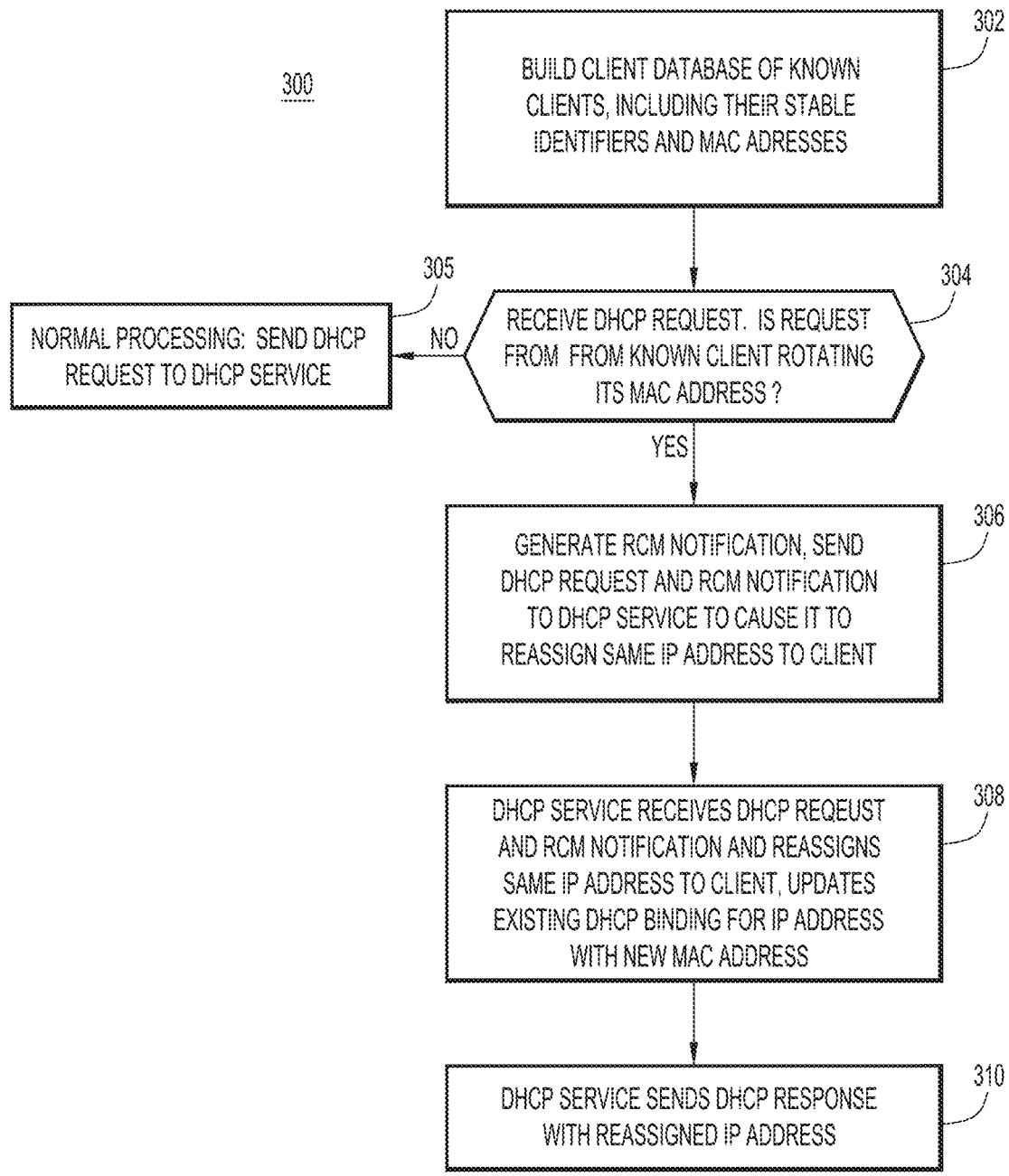
FIG. 3 is a flowchart of a method in which a wireless infrastructure of the network environment detects, and indicates to a DHCP service, MAC address rotations by wireless client devices to cause reassignment/extension of lease times of IP addresses currently assigned to the wireless client devices, according to an example embodiment.

With reference to FIG. 3, there is a flowchart of an example method 300 in which the wireless infrastructure (e.g., wireless infrastructure 112, including WLC 102 and/or APs 106) detects and indicates RCM events to DHCP service 120 to cause it to reassign/extend currently assigned IP addresses, according to the first embodiment. The first embodiment assumes that clients 110(1)-110(N) perform MAC rotations, and that each client uses a stable identifier (also referred to as a "client identifier") that uniquely identifies the client for communications with the wireless infrastructure. The term "stable" means that the identifier does not change across MAC rotations. Examples of a stable identifier may include a user name associated with the client, a unique hardware embedded identifier, a stable device address, an IEEE 802.1X identity, and so on.

At 302, WLC 102 performs background/a priori operations to build or create a client database of known or recognized clients among clients 110(1)-110(N) based on initial or first time communications received from the clients. The client database includes entries that map stable identifiers, used by the clients in their first time communications, to their corresponding MAC address used in the first time communications. For example, assume WLC 102 receives, from one of the clients 110(1)-110(N), a DHCP request that includes a stable identifier for the client and a MAC address asserted by the client. Upon receiving the DHCP request, WLC 102 searches the known client database for an entry that lists the stable/client identifier. When the stable identifier is not found by the search (indicating, e.g., that this is a first DHCP request from the client with the asserted MAC address), WLC 102 creates a new entry for the client in the client database that maps the stable identifier to the MAC address. Subsequently, when WLC 102 receives another DHCP request that includes the same stable identifier, the WLC may use the stable identifier as an index into the entry that maps the stable identifier to the MAC address last (i.e., previously) used by the client.

At 304, WLC 102 receives a DHCP request for an IP address. The DHCP request includes a stable identifier and a MAC address for a client that originated the DHCP request. Upon receiving the DHCP request, WLC 102 examines the DHCP request against the client database to determine whether (i) the DHCP request originated from a client that is connecting to the wireless infrastructure for the first time, or (ii) the DHCP request originated from a client that was previously connected to the WLC and was allocated an IP address at that time with a lease that is still active, i.e., the DHCP request is likely due to a MAC rotation at the client. For example, WLC 102 searches the client database using the stable identifier from the DHCP request to find a matching entry. The absence of a matching entry indicates condition (i) is true, i.e., the DHCP request originated from a client that is connecting to the wireless infrastructure for the first time. In this case, flow proceeds to 305, where WLC 102 simply relays the DHCP request to DHCP service 120 for a new IP address assignment.

On the other hand, when a matching entry is found, WLC 102 compares the MAC address in the matching entry to the MAC address in the DHCP request. When the MAC addresses differ, condition (ii) is true, i.e., the DHCP request originated from a client due to a MAC rotation. In this case, flow proceeds to 306.

At 306, WLC 102 generates an RCM notification—an indication of an occurrence of a MAC address rotation event—and forwards or relays the DHCP request to DHCP service 120 along with the notification. The RCM notification includes information to inform DHCP service 120 that the DHCP request originated from the client due to the RCM event, to cause the DHCP service to reassign to the client the same IP address that was previously assigned to the client, instead of assigning a new/different IP address. WLC 102 may convey the RCM notification to DHCP service 120 in different ways. For example, WLC 102 may embed or encode the RCM notification into one or more option fields of the DHCP request itself to produce a modified DHCP request, and then forward the modified DHCP request. In another example, WLC 102 may communicate the RCM notification to DHCP service 120 using an application programming interface (API) call concurrently with forwarding the DHCP request. In yet another example, WLC 102 may forward the RCM notification as a separate message. Information conveyed by the RCM notification may include one or more of the following:

a. Event code: RCM on WLAN j (new API value/DHCP option field).
b. Original MAC address=Y.Y.Y (new API value/DHCP option field).
c. IP address assigned=a.b.c.d (e.g., DHCP option 61, Requested IP address).
d. New MAC address=X.X.X (e.g., DHCP option 61, Client ID).

Upon receiving the DHCP request with the RCM notification, at 308, DHCP service 120 searches existing DHCP bindings for one that matches the original MAC address (e.g., Y.Y.Y) and the corresponding IP address previously assigned (e.g., a.b.c.d) as specified in the RCM notification. When the match is found, DHCP service 120 updates the found (existing) DHCP binding with the new MAC address (e.g., X.X.X) (i.e., replaces the old/previous MAC address with the new MAC address in the existing binding). DHCP service 120 does not assign a new, different IP address to the client/new MAC address; however, DHCP service 120 may extend a remaining lease time of the IP address across the MAC address rotation.

At 310, DHCP service 120 sends to the client a DHCP response to the DHCP request. The DHCP response includes the IP address reassignment, i.e., the previously assigned IP address, as well as the new MAC address. The DHCP response may be in the form of one or more of a DHCP offer and a DHCP acknowledge. WLC 102 receives the DHCP response and relays it to the client.

Additionally, for accounting purposes, DHCP service 120 may record MAC address changes for each client and compute for each client the frequency of MAC rotations based on RCM notifications received from WLC 102 for each client over time. DHCP service 120 may also determine a mean observed MAC address rotation interval for a plurality of clients based on the frequency of MAC rotations for each client, and dynamically adjust the lease time accordingly (e.g., increasing the least time, such as setting the lease value to a value greater than twice the mean rotation interval, which ensures that the above-described method occurs in most cases within a first half life of the lease). Also, a type of the client is detected (e.g., a vendor of an operating system running on the client and/or a version of the operating system) and each client type receives lease lifetime that is specific to the type.

The second embodiment is now described. In the second embodiment, the network infrastructure does not detect MAC address rotations, and thus does not assist in coordination of updating DHCP bindings (i.e., IP address-to-MAC address mappings) maintained by DHCP service 120. Without such coordination, address exhaustion of a DHCP address pool (i.e., a pool of IP addresses available for assignment to requesting clients) is a function of a number of IP addresses in the pool, the lease time assigned to each IP address, a number of clients associated to the wireless infrastructure, and a frequency of their MAC address rotations. MAC address rotation parameters vary by client, but generally define MAC address rotations at a more frequent interval than a lease time of an IP address. Under these conditions, address exhaustion is more likely to occur. Accordingly, in the second embodiment, DHCP service 120 actively adapts the DHCP (IP) lease time to reflect the MAC address rotations in order avoid address exhaustion.

Figure 4:
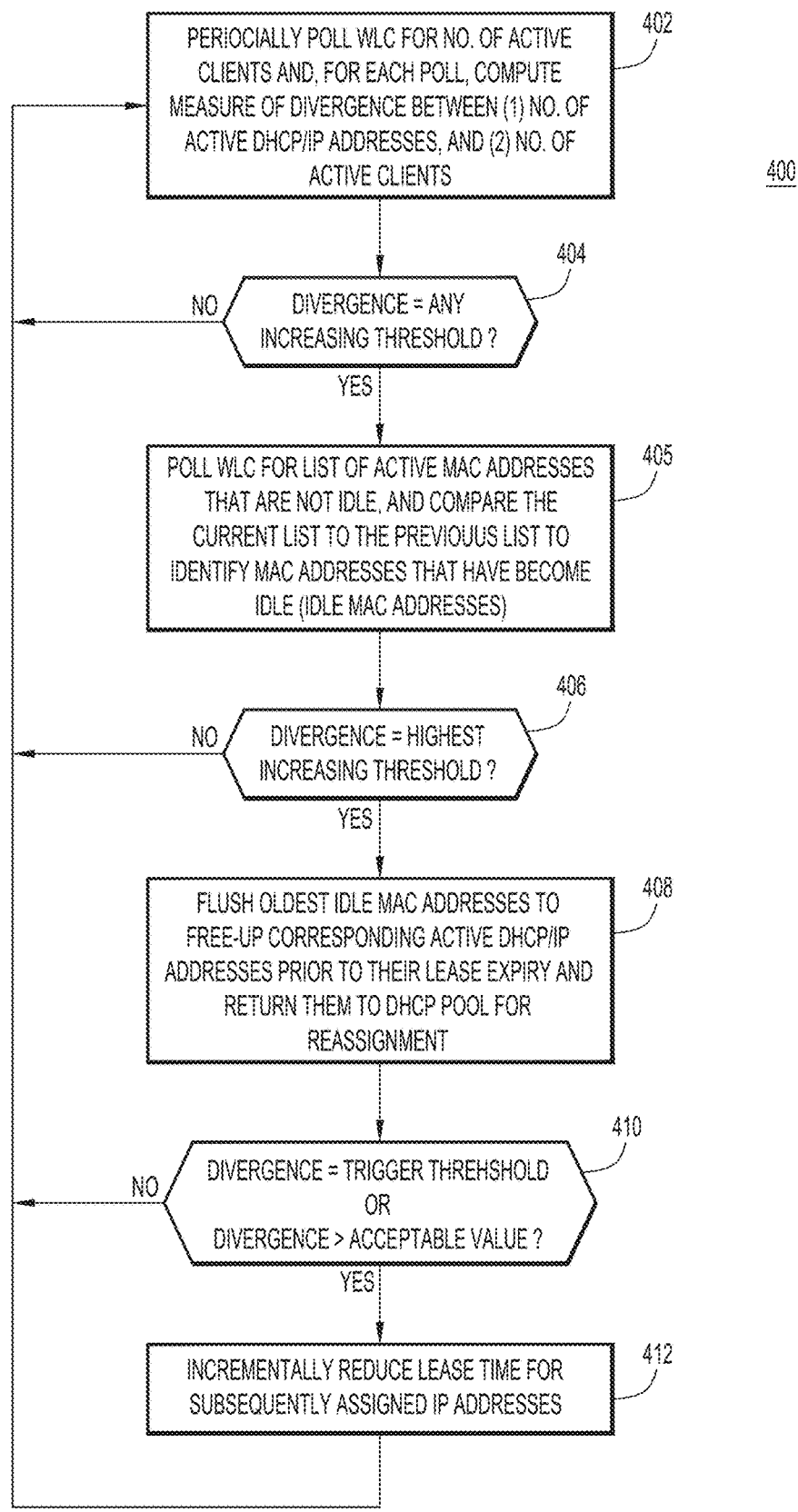
FIG. 4 is a flowchart of a method of adjusting Internet Protocol (IP) address lease time to avoid DHCP address pool exhaustion in response to information about wireless client devices polled from the wireless infrastructure, according to an example embodiment.

With reference to FIG. 4, there is a flowchart of a method 400 of adjusting IP address lease time to avoid DHCP address pool exhaustion in response to poll information from the wireless infrastructure, according to the second embodiment. On DHCP service 120, a scope is defined for WLAN 108 where RCM is expected to occur, e.g., through identification of a "locally administered bit" in client DHCP messages. Additionally, API access (e.g., using Representational State Transfer Configuration Protocol (RESTCONF) to WLC 102 is identified on DHCP service 120 to enable the DHCP service to poll the WLC for, and consolidate, an actual number of active RCM clients with active IP address leases, as will be described.

At 402, DHCP service 120 repeatedly polls (e.g., periodically sends requests to) WLC 102 for a number of active clients among clients 110(1)-110(N) associated with the wireless infrastructure. The polling queries are generally consistent with the scope of IP address assignments by DHCP service 120 to the IP subnet corresponding to WLAN 108. In an example, an active client is a client engaged in a session for which a predefined elapsed time (e.g., a session timeout interval as defined under IEEE 802.11) has not expired. In response to each request, WLC 102 responds with the (current) number of active clients. DHCP service 120 also tracks the number of active IP addresses assigned by the DHCP service to clients 110(1)-110(N) and that have lease times that have not expired. DHCP service 120 also tracks a number of IP addresses in the DHCP pool available for assignment. These are referred to as "available IP addresses."

For each poll, DHCP service 120 correlates the number of active IP addresses to the number of active clients, to produce a measure of divergence or difference (also referred to simply as the "divergence") between the two numbers. In one example, DHCP service 120 computes, as the measure of divergence, a ratio of the number of active IP addresses to the number of active clients, which may be expressed as a percentage, for example. In another example, the measure of divergence may be a difference between the two numbers. While the number of active clients may equal the number of active IP addresses in some situations, MAC address rotations can result in the number of active IP addresses being greater than the number of active clients. Moreover, as the number of clients performing MAC address rotation increases, the number of active IP address and the number of active clients begin to diverge further (e.g., the divergence increases), until a point where DHCP service 120 is nearing address exhaustion.

DHCP service 120 maintains a set of increasing poll thresholds and a trigger threshold for comparison against the divergence (e.g., for the above-mentioned ratio). In an example, the increasing poll thresholds increase from a lowest poll threshold (e.g., 25%) to a highest poll threshold (e.g., 75%) in regular increments (e.g., 5% increments). To monitor for increasing levels of address exhaustion, at 404, DHCP service 120 compares the divergence (e.g., ratio) against each of the poll thresholds. While the divergence (e.g., ratio) has not reached any of the poll thresholds, flow returns to 402. On the other hand, when the divergence reaches one of the poll thresholds (e.g., 25%), flow proceeds to 405.

At 405, DHCP service 120 polls WLC 102 for a current list of active MAC addresses of active clients. In response, WLC 102 returns the current list of active MAC addresses. Upon receiving the current list of active MAC addresses, DHCP service 120 records the current list, and matches the active MAC addresses on the current list to the active MAC addresses on a previous list returned by WLC 102 in response to a previous poll, to identify MAC addresses that have become idle. That is, active MAC addresses on the previous list that are not on the current list represent the MAC addresses that have become idle (i.e., their corresponding clients have become inactive) since the previous poll. Flow proceeds to 406.

At 406, DHCP service 120 determines whether the divergence (e.g., the ratio) has reached the highest poll threshold. When the divergence has not reached/not met the highest poll threshold, flow returns to 402. When the divergence has reached/met the highest poll threshold, flow proceeds to 408. At 408, DHCP service 120 identifies existing DHCP bindings that each have an active IP address and an idle MAC address, and sorts those DHCP binding into sorted DHCP bindings according to the lengths of time their MAC addresses have been idle. DHCP service 120 then "flushes" or removes a number of the sorted DHCP bindings having MAC addresses that have been idle the longest (e.g., that have been idle for the largest number of polls in operation 405), to free-up the IP addresses that were tied to the flushed DHCP bindings, even before the lease times of the IP addresses have expired. DHCP service 120 returns or re-inserts the freed-up IP addresses to the DHCP address pool for subsequent reassignment to clients.

In one example, when the divergence reaches an even larger, trigger threshold that is greater than the poll thresholds and that represents that IP address exhaustion is near, DHCP service 120 determines and sets a lower (average) lease time of new address assignments to better align a number of active clients with active IP address leases. DHCP service 120 may also incrementally lower the lease time for addresses within the scope. This is in contrast to traditional implementations, in which lease times are generally static and do not change based on network activity. DHCP service 120 may monitor an IP address scope utilization (e.g., the remaining number of available IP addresses) along with the measure of divergence mentioned above (e.g., ratio) to base decisions on when to lower the lease time. Also, DHCP service 120 may implement a control-loop, where the lease times are incrementally lowered until (1) address exhaustion is averted, and (2) the divergence is within a predefined acceptable limit (e.g. active leases are no more than 20% of an active client count).

To process lease times, flows proceeds to 410. At 410, DHCP service 120 determines whether the divergence has reached the trigger threshold indicating the DHCP address pool is near exhaustion, or whether the divergence exceeds an acceptable low value, which is less than the trigger threshold. When neither of the aforementioned conditions is true (i.e., the DHCP address pool is not near exhaustion and the measure of divergence does not exceed the acceptable low value), flow returns to 402. When either of the aforementioned conditions is true, flow proceeds to 412. At 412, DHCP service 120 lowers the lease time used for IP address assignments by an increment, and flow returns to 402.

Method 400 repeats over time. It is understood that the order of operations performed in method 400 may be permuted and certain operations may be omitted. For example, operations 406 and 408 may be omitted. Alternatively, operations 410 and 412 may be omitted. Also, the comparisons performed in operations 404, 406, and 410 may be performed more or less in parallel, at the same time, or in series as depicted in FIG. 4.

In some examples, a client with a DHCP assigned IP address verifies a validity of the IP address at an interval. One process for such validation is that, at mid lease time (e.g. 1 hour if the lease is 2 hours), the client sends a DHCP renew request to the DHCP service (then at half [¾] the lease time, then at the end of the lease time). The request is a DHCP request that indicates the address that the client seeks to reserve (the previous IP address). The DHCP service responds with a DHCP acknowledgement (ACK) message (indicating the client is allowed to use that address with no further option). As the client requests lease validation, the DHCP service returns a new lease left duration indication. The new lease left duration indication may be provided in a DHCP negative acknowledgment (NACK) message. This forces the client to renew its IP address. Alternatively, the indication may be provided in a new DHCP offer message that indicates the offered IP address and a new lease time. If a client does not send lease validation messages (e.g. because they have not reached ½ or ¾ lease yet, or because they do not support lease validation), a network infrastructure component, such as a WLC, acting as a DHCP proxy, sends gratuitous lease duration updates to the client (similarly as above, either with a DHCP NACK at a time of the client being idle, forcing the client to renew its IP address, or in a gratuitous DHCP offer with the new lease duration value), thus reducing the lease to the new value.

Additionally, a network infrastructure component (e.g., a WLC) dynamically updates a domain name service (DNS) with a new authentication, authorization, and accounting (AAA)-to-IP validity value.

Figure 5:
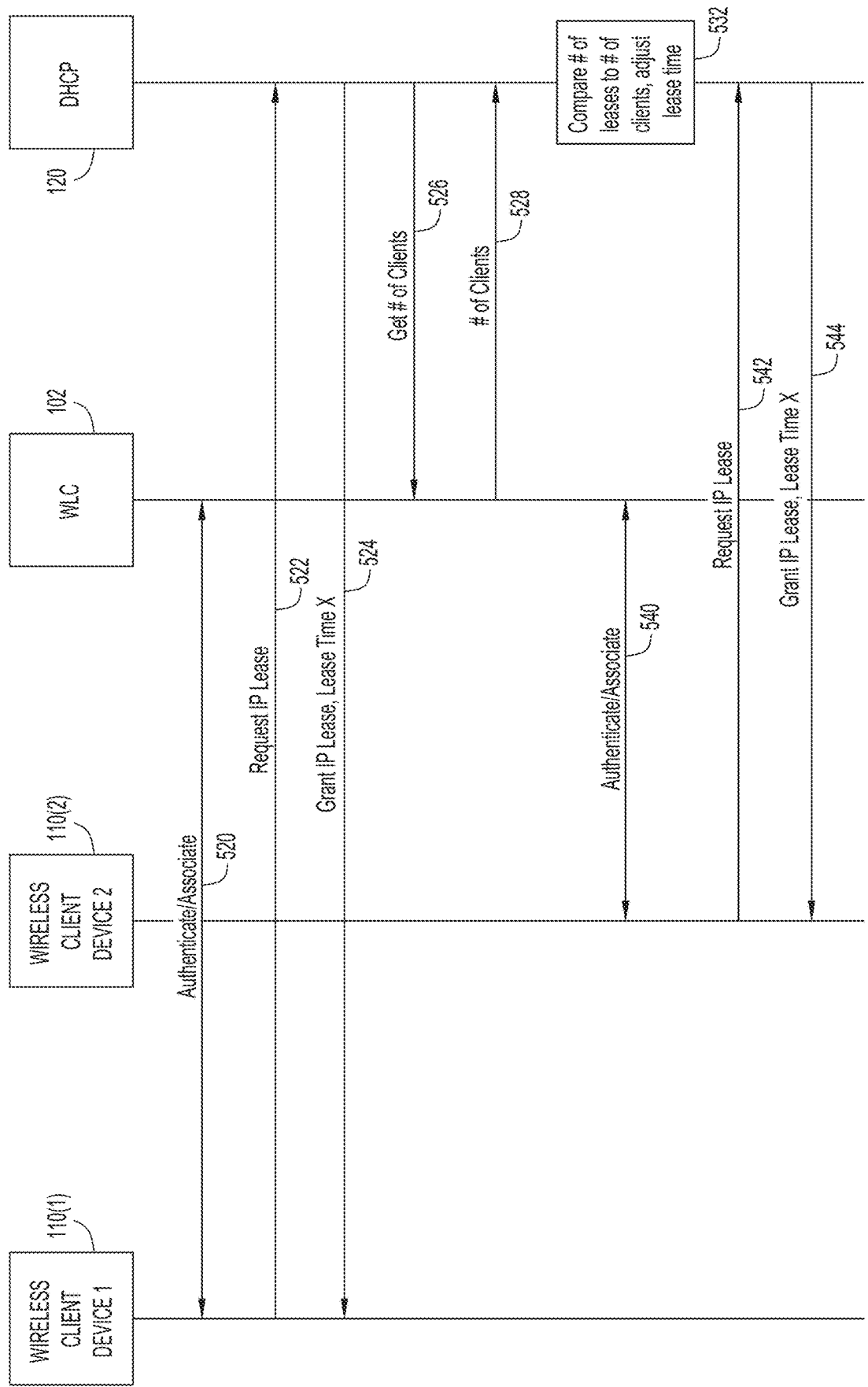
FIG. 5 is a transaction diagram corresponding to the method of FIG. 4, according to an example embodiment.

With reference to FIG. 5, there is a sequence diagram showing a message exchange between a first client 110(1), a second client 110(2), WLC 102, and DHCP service 120 in accordance with the second embodiment. The first client 110(1) performs an authentication and/or association 520 with the WLC 102. The first client 110(1) then requests an IP address lease from the DHCP service 120 via the DHCP request message 522. The DHCP service 120 grants an IP address lease to the first client 110(1) and provides the leased IP address in a DHCP ACK message 524. The granted IP address has a first lease time, shown as "X." At 526, the DHCP service 120 then requests, from the WLC 102, an indication of a number of active or associated clients of the WLC 102. The number of active or associated clients requested by the DHCP service 120 corresponds to a number of active clients within a scope of network devices consistent with those devices that may request IP addresses from the DHCP service 120. Thus, for example, if the WLC 102 manages 10 APs, and any clients associated with those APs obtain IP address leases from the DHCP service 120, the request 526 requests an indication of a number of clients associated with those 10 APs. The WLC 102 then responds to the request 526 with a response 528. The response indicates the currently active number of clients. In step 532, the DHCP service 120 compares the number of active clients obtained from the WLC 102 with a number of active IP address leases maintained by the DHCP service 120. As discussed above, based on a relation between these two numbers, and a number of IP address leases remaining unallocated at the DHCP service 120, the DHCP service 120 adjusts a lease time associated with future granted IP address leases. The second client 110(2) then authenticates and/or associates with the WLC 102 via message exchange 540. The second client 110(2) then requests an IP address lease via request 542. The DHCP service 120 then provides an IP address to the second client 110(2), with the lease of the IP address provided in the DHCP ACK message 544 being set according to the determination made in step 532.

Figure 6:
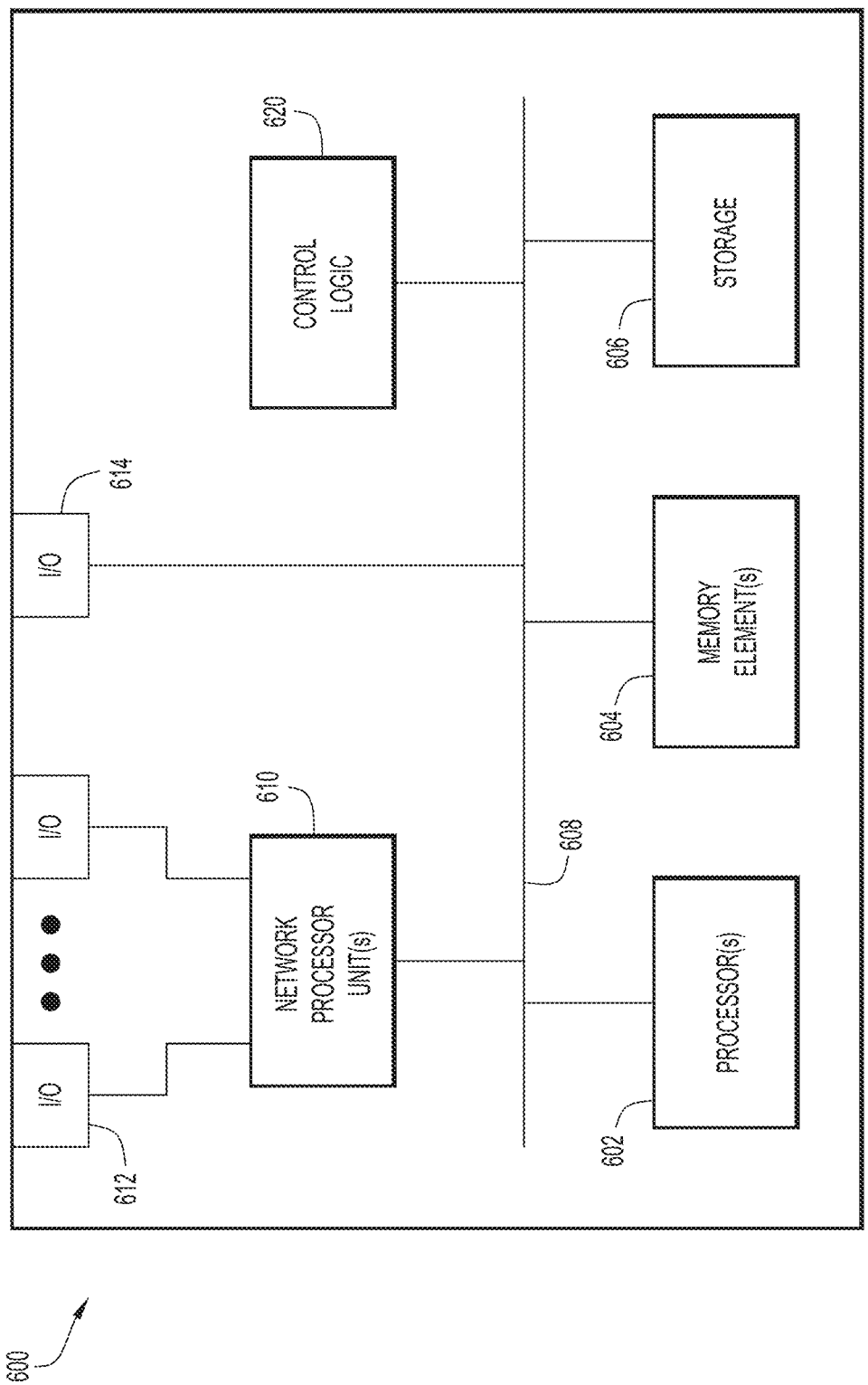
FIG. 6 is a hardware block diagram of a device that may perform functions associated with operations discussed herein.

FIG. 6 is a hardware block diagram of a device 600 that may perform functions associated with any of the operations discussed above, such as but not limited to any of the discussions of FIGS. 1-5. In various embodiments, any of the devices described above (e.g., an AP, a wireless network/LAN controller, a DHCP server/service, a domain name system service/server) implement, in some embodiments, a computing architecture that is the same as or analogous to that described below with respect to the device 600.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, virtual LAN (VLAN), WAN (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), IEEE 802.11 (e.g., Wi-Fi g/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in a first aspect, a method is provided comprising: at a controller of wireless access points through which wireless client devices communicate with the controller: upon receiving, from a wireless client device, a dynamic host configuration protocol (DHCP) request having a media access control (MAC) address, determining whether the wireless client device rotated its MAC address from a previous MAC address to the MAC address; when the wireless client device rotated its MAC address, forwarding, to a DHCP service, the DHCP request with a notification of a MAC address rotation to cause the DHCP service to reassign a previously assigned Internet Protocol (IP) address to the wireless client device; and upon receiving, from the DHCP service, a DHCP offer asserting the previously assigned IP address, forwarding the DHCP offer to the wireless client device.

In a second aspect, an apparatus is provided comprising: a network input/output interface to communicate with one or more networks; and a processor implemented in a controller of wireless access points through which wireless client devices communicate with the controller, the processor coupled to the network input/output interface and configure to perform: upon receiving, from a wireless client device, a dynamic host configuration protocol (DHCP) request having a media access control (MAC) address, determining whether the wireless client device rotated its MAC address from a previous MAC address to the MAC address; when the wireless client device rotated its MAC address, forwarding, to a DHCP service, the DHCP request with a notification of a MAC address rotation to cause the DHCP service to reassign a previously assigned Internet Protocol (IP) address to the wireless client device; and upon receiving, from the DHCP service, a DHCP offer asserting the previously assigned IP address, forwarding the DHCP offer to the wireless client device.

In a third aspect, a non-transitory computer readable storage medium comprising instructions that when executed by a processor of a controller of wireless access points through which wireless client devices communicate with the controller, cause the processor to perform: upon receiving, from a wireless client device, a dynamic host configuration protocol (DHCP) request having a media access control (MAC) address, determining whether the wireless client device rotated its MAC address from a previous MAC address to the MAC address; when the wireless client device rotated its MAC address, forwarding, to a DHCP service, the DHCP request with a notification of a MAC address rotation to cause the DHCP service to reassign a previously assigned Internet Protocol (IP) address to the wireless client device; and upon receiving, from the DHCP service, a DHCP offer asserting the previously assigned IP address, forwarding the DHCP offer to the wireless client device.

In a fourth aspect, a method is provided comprising: at a dynamic host configuration protocol (DHCP) service configured to assign Internet Protocol (IP) addresses from a pool of IP addresses to client devices configured to communicate wirelessly through a wireless infrastructure including wireless access points and a controller: repeatedly polling the wireless infrastructure for a number of active client devices on the wireless infrastructure and, for each polling, computing a divergence between (i) a number of active IP addresses assigned by the DHCP service to the client devices and that have a lease time that has not expired, and (ii) the number of active client devices; comparing the divergence to a trigger threshold indicating the pool of IP addresses is near exhaustion; and when the divergence reaches the trigger threshold, reducing the lease time for subsequently assigned IP addresses.

The method may further comprise: comparing the divergence to an acceptable threshold that is less than the trigger threshold; and when the divergence exceeds the acceptable threshold, reducing the lease time for subsequently assigned IP addresses.

The method may further comprise: when the divergence has not reached the trigger threshold and does not exceed the acceptable threshold, not reducing the lease time for subsequently assigned IP addresses.

The method of may further comprise: comparing the divergence to increasing poll thresholds that are below the trigger threshold; when the divergence reaches any of the increasing poll thresholds, polling the controller for a list of media access control (MAC) addresses of active client devices, and comparing the list to a previous list from previous polling to identify MAC addresses that have become idle; and identifying DHCP bindings with MAC addresses that have become idle for a longest time based on comparing the list to the previous list, and freeing-up IP addresses in the DHCP bindings for subsequent reassignment.

The method may further comprise: performing identifying DHCP bindings and freeing-up IP addresses when the divergence reaches a highest threshold among the increasing thresholds.

In the method, freeing-up may include: deleting the DHCP bindings and returning the IP addresses to the pool of IP addresses for reassignment.

In the method, the increasing thresholds correspond to increasing levels of exhaustion of a number of IP addresses allocated to the DHCP service for assignment to the client devices.

In the method, computing divergence may include computing the divergence as a ratio of the number of active IP addresses to the number of active client devices.

The method the active client devices may each be engaged in a communication session using the wireless infrastructure and for which a session timeout interval has not expired.

In a fifth aspect, an apparatus is provided comprising: a network input/output interface to communicate with one or more networks; and a processor for a dynamic host configuration protocol (DHCP) service configured to assign Internet Protocol (IP) addresses from a pool of IP addresses to client devices configured to communicate wirelessly through a wireless infrastructure including wireless access points and a controller, the processor coupled to the network input/output interface and configured to perform: repeatedly polling the wireless infrastructure for a number of active client devices on the wireless infrastructure and, for each polling, computing a divergence between (i) a number of active IP addresses assigned by the DHCP service to the client devices and that have a lease time that has not expired, and (ii) the number of active client devices; comparing the divergence to a trigger threshold indicating the pool of IP addresses is near exhaustion; and when the divergence reaches the trigger threshold, reducing the lease time for subsequently assigned IP addresses.

In a sixth aspect, a non-transitory computer readable storage medium comprising instructions that when executed by a processor for a dynamic host configuration protocol (DHCP) service configured to assign Internet Protocol (IP) addresses from a pool of IP addresses to client devices configured to communicate wirelessly through a wireless infrastructure including wireless access points and a controller, cause the processor to perform: repeatedly polling the wireless infrastructure for a number of active client devices on the wireless infrastructure and, for each polling, computing a divergence between (i) a number of active IP addresses assigned by the DHCP service to the client devices and that have a lease time that has not expired, and (ii) the number of active client devices; comparing the divergence to a trigger threshold indicating the pool of IP addresses is near exhaustion; and when the divergence reaches the trigger threshold, reducing the lease time for subsequently assigned IP addresses.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a wireless local area network (WLAN) controller (WLAN controller) configured to communicate with and control wireless access points through which wireless client devices communicate with the WLAN controller:
      upon receiving, from a wireless client device, a dynamic host configuration protocol (DHCP) request (DHCP request) having a media access control (MAC) address (MAC address) and a client identifier configured to be stable across MAC rotations, determining whether the wireless client device rotated its MAC address from a previous MAC address to the MAC address based on the client identifier;
      when the wireless client device rotated its MAC address, generating a notification of a MAC address rotation, and forwarding the DHCP request with the notification of the MAC address rotation to a DHCP service to cause the DHCP service to reassign a previously assigned Internet Protocol (IP) address to the wireless client device; and
      upon receiving, from the DHCP service, a DHCP offer asserting the previously assigned IP address, forwarding the DHCP offer to the wireless client device; and
   at the DHCP service:
      upon receiving, from the WLAN controller, notifications of the MAC rotations for the wireless client devices, determining a mean MAC address rotation interval based on the notifications; and
   adjusting an IP address lease time based on the mean MAC address rotation interval.

2. The method of claim 1, wherein determining includes:
   searching for, and finding, the client identifier in mappings of client identifiers to previous MAC addresses used by the wireless client devices in previous communications to the WLAN controller; and
   determining that the wireless client device rotated its MAC address when the MAC address differs from the previous MAC address as indicated in the mappings.

3. The method of claim 2, wherein the previous communications include receiving DHCP requests from the wireless client devices.

4. The method of claim 1, wherein the notification includes:
   an event code to indicate a randomized and changing MAC address (RCM) event, the MAC address, the previous MAC address, and the previously assigned IP address.

5. The method of claim 1, further comprising:
   encoding the notification into one or more option fields of the DHCP request.

6. The method of claim 1, further comprising:
   sending the notification to the DHCP service in a message that is separate from the DHCP request.

7. The method of claim 1, further comprising, at the DHCP service:
   upon receiving the DHCP request with the notification, reassigning the previously assigned IP address to the wireless client device based on the notification; and
   forwarding, to the wireless client device via the WLAN controller, the DHCP offer indicating the previously assigned IP address.

8. The method of claim 1, further comprising, at the DHCP service:
   replacing the previous MAC address with the MAC address in an existing DHCP binding to the previously assigned IP address.

9. An apparatus comprising:
a network input/output interface to communicate with one or more networks; and
a processor of a wireless local area network (WLAN) controller (WLAN controller) configured to communicate with and control wireless access points through which wireless client devices communicate with the WLAN controller, the processor coupled to the network input/output interface and configured to perform:
   upon receiving, from a wireless client device, a dynamic host configuration protocol (DHCP) request (DHCP request) having a media access control (MAC) address (MAC address) and a client identifier configured to be stable across MAC rotations, determining whether the wireless client device rotated its MAC address from a previous MAC address to the MAC address based on the client identifier;
   when the wireless client device rotated its MAC address, generating a notification of a MAC address rotation, and forwarding the DHCP request with the notification of the MAC address rotation to a DHCP service to cause the DHCP service to reassign a previously assigned Internet Protocol (IP) address to the wireless client device; and
   upon receiving, from the DHCP service, a DHCP offer asserting the previously assigned IP address, forwarding the DHCP offer to the wireless client device,
wherein the DHCP service is configured to perform:
   upon receiving, from the WLAN controller, notifications of the MAC rotations for the wireless client devices, determining a mean MAC address rotation interval based on the notifications; and
   adjusting an IP address lease time based on the mean MAC address rotation interval.

10. The apparatus of claim 9, wherein the processor is configured to perform determining by:
   searching for, and finding, the client identifier in mappings of client identifiers to previous MAC addresses used by the wireless client devices in previous communications to the WLAN controller; and
   determining that the wireless client device rotated its MAC address when the MAC address differs from the previous MAC address as indicated in the mappings.

11. The apparatus of claim 10, wherein the previous communications include receiving DHCP requests from the wireless client devices.

12. The apparatus of claim 9, wherein the notification includes:
   an event code to indicate a randomized and changing MAC address (RCM) event, the MAC address, the previous MAC address, and the previously assigned IP address.

13. The apparatus of claim 9, wherein the processor is further configured to perform:
   encoding the notification into one or more option fields of the DHCP request.

14. The apparatus of claim 9, wherein the processor is further configured to perform:
   sending the notification to the DHCP service in a message that is separate from the DHCP request.

15. Non-transitory computer readable media encoded with instruction that, when executed by one or more processors, cause the one or more processors to perform:
   by a wireless local area network (WLAN) controller (WLAN controller) configured to communicate with and control wireless access points through which wireless client devices communicate with the WLAN controller:
      upon receiving, from a wireless client device, a dynamic host configuration protocol (DHCP) request (DHCP request) having a media access control (MAC) address (MAC address) and a client identifier configured to be stable across MAC rotations, determining whether the wireless client device rotated its MAC address from a previous MAC address to the MAC address based on the client identifier;
      when the wireless client device rotated its MAC address, generating a notification of a MAC address rotation, and forwarding the DHCP request with the notification of the MAC address rotation to a DHCP service to cause the DHCP service to reassign a previously assigned Internet Protocol (IP) address to the wireless client device; and
      upon receiving, from the DHCP service, a DHCP offer asserting the previously assigned IP address, forwarding the DHCP offer to the wireless client device; and
   by the DHCP service:
      upon receiving, from the WLAN controller, notifications of the MAC rotations for the wireless client devices, determining a mean MAC address rotation interval based on the notifications; and
      adjusting an IP address lease time based on the mean MAC address rotation interval.

16. The non-transitory computer readable media of claim 15, wherein the instructions to cause the one or more processors to perform determining include instructions to cause the one or more processors to perform:
   searching for, and finding, the client identifier in mappings of client identifiers to previous MAC addresses used by the wireless client devices in previous communications to the WLAN controller; and
   determining that the wireless client device rotated its MAC address when the MAC address differs from the previous MAC address as indicated in the mappings.

17. The non-transitory computer readable media of claim 16, wherein the previous communications include receiving DHCP requests from the wireless client devices.

18. The non-transitory computer readable media of claim 15, wherein the notification includes:
   an event code to indicate a randomized and changing MAC address (RCM) event, the MAC address, the previous MAC address, and the previously assigned IP address.

19. The non-transitory computer readable media of claim 15, further comprising instructions to cause the one or more processors to perform:
   by the WLAN controller, encoding the notification into one or more option fields of the DHCP request.

20. The non-transitory computer readable media of claim 15, further comprising instructions to ca use the one or more processors to perform, by the WLAN controller:
   sending the notification to the DHCP service in a message that is separate from the DHCP request.

* * * * *